US009876896B1

(12) United States Patent
Gailloux et al.

(10) Patent No.: US 9,876,896 B1
(45) Date of Patent: Jan. 23, 2018

(54) SYSTEM AND METHOD OF INTERDICTING MALWARE INFILTRATION AS SPOOFED ADVERTISEMENT (71) Applicant: Sprint Communications Company L.P., Overland Park, KS (US)

(72) Inventors: Michael A. Gailloux, Overland Park, KS (US); Peter K. O'Brien, Shawnee, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 29 days.

(21) Appl. No.: 15/188,842

(22) Filed: Jun. 21, 2016

(51) Int. Cl.
*H04M 1/66* (2006.01)
*H04M 1/725* (2006.01)
*H04W 4/20* (2009.01)
*H04W 12/08* (2009.01)
*H04L 29/06* (2006.01)
*G06Q 30/02* (2012.01)

(52) U.S. Cl.
CPC .... *H04M 1/72577* (2013.01); *G06Q 30/0277* (2013.01); *H04L 63/06* (2013.01); *H04L 63/145* (2013.01); *H04L 63/1433* (2013.01); *H04L 63/20* (2013.01); *H04M 1/72525* (2013.01); *H04M 1/72569* (2013.01); *H04W 4/206* (2013.01); *H04W 12/08* (2013.01)

(58) Field of Classification Search
CPC ............. H04L 63/145; H04L 29/06877; H04L 63/1408; H04L 45/306; H04L 47/14; H04L 47/2441; H04L 63/0245; H04L 63/1483; H04L 63/14; H04L 63/1466; H04L 67/02; G06Q 30/0277; H04M 3/4878
USPC ........................................... 455/414.1–414.3
See application file for complete search history.

(56) References Cited

U.S. PATENT DOCUMENTS

2016/0105449 A1\* 4/2016 Montagnon ......... H04L 67/2814
726/22
2016/0232349 A1\* 8/2016 Baeder .................... H04W 4/12

\* cited by examiner

*Primary Examiner* — Ronald Eisner (57) ABSTRACT

A method of thwarting infiltration of malware onto a mobile communication device. The method comprises a filtering application executing on an ad gateway server computer analyzing a mobile advertisement by to determine a signature of the mobile advertisement, where the signature comprises at least one of a brand identity, a color scheme, a reference image, and a font type, searching a rules data store using the signature of the mobile advertisement as a search key to obtain a first rule, and identifying a first mobile presentation context in the first rule. The method further comprises the filtering application determining that a mobile presentation context of a mobile communication device to which the mobile advertisement is directed by matches the first mobile presentation context and the filtering application blocking transmission of the mobile advertisement from the ad gateway server to the mobile communication device.

8 Claims, 7 Drawing Sheets

SYSTEM AND METHOD OF INTERDICTING MALWARE INFILTRATION AS SPOOFED ADVERTISEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices increasingly are computing platforms that users employ to browse the Internet, to engage in social networking, to play games, to listen to music, to watch movies, to make on-line purchases, and other activities. Users may download mobile applications from the network and install them on their devices. In some cases the mobile applications may be endorsed or approved by the mobile communication service provider. Such endorsed mobile applications may have completed a testing program to reduce the likelihood that they may cause harm to the mobile communication device or may pose cyber security risks to the device. In other cases, however, the applications may be obtained from third parties that have no affiliation with the service provider and may not have performed adequate testing and security hardening of their mobile application.

SUMMARY

In an embodiment, a method of thwarting infiltration of malware onto a mobile communication device is disclosed. The method comprises receiving a report on a malicious mobile advertisement by a rules adaptation application executing on an analysis server computer, where the report comprises information about the malicious mobile advertisement, adding a new rule to a rules data store by the rules adaptation application based on the report of the malicious mobile advertisement, where the rules in the rules data store comprise a signature of a mobile advertisement and a mobile advertisement presentation context and the signature comprises at least one of a brand identity, a color scheme, a reference image, and a font type, and analyzing a mobile advertisement by a filtering application executing on an ad gateway server computer to determine a signature of the mobile advertisement. The method further comprises searching the rules data store by the filtering application using the signature of the mobile advertisement as a search key to obtain a first rule, identifying a first mobile presentation context in the first rule by the filtering application, determining that a mobile presentation context of a mobile communication device to which the mobile advertisement is directed by the filtering application matches the first mobile presentation context, and blocking by the filtering application transmission of the mobile advertisement from the ad gateway server to the mobile communication device.

In another embodiment, a computer system is disclosed. The computer system comprises a processor, a non-transitory memory storing a plurality of rules that identify signatures of mobile advertisements to be blocked associated to a mobile presentation context, a mobile advertisement gateway application stored in the non-transitory memory, and a mobile advertisement filtering application stored in the non-transitory memory. When the mobile advertisement gateway application is executed by the processor it receives requests from mobile communication devices for mobile advertisements, requests mobile advertisements from mobile advertisement platforms, receives mobile advertisements from mobile advertisement platforms, and transmits at least some of the received mobile advertisements to at least some of the mobile communication devices that request mobile advertisements. When the mobile advertisement filtering application is executed by the processor it analyzes a first one of the mobile advertisements received from the mobile advertisement platforms to determine a first signature of the first mobile advertisement, accesses a first rule from the non-transitory memory using the first signature as a search key, where the first rule identifies a first mobile presentation context, and determines a first mobile communication device that requested an advertisement that the first mobile advertisement corresponds to. The mobile advertisement filtering application further determines that the first mobile communication device matches the first mobile presentation context and, based on applying the first rule to the first mobile advertisement, determines that the first mobile advertisement is to be blocked from presentation on the first mobile communication device, whereby mobile advertisements are selectively blocked from presentation on mobile communication devices.

In yet another embodiment, a method of thwarting infiltration of malware onto a mobile communication device is disclosed. The method comprises analyzing a mobile advertisement by a filtering application executing on an ad gateway server computer to determine a signature of the mobile advertisement, where the signature comprises at least one of a brand identity, a color scheme, a reference image, and a font type, searching a rules data store by the filtering application using the signature of the mobile advertisement as a search key to obtain a first rule, and blocking by the filtering application transmission of the mobile advertisement form the ad gateway server to the mobile communication device based on the match between the first rule and the signature of the mobile advertisement.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method for interdicting infiltration of malware onto a mobile communication device, where the malware is spoofing a mobile advertisement (i.e., is pretending to be a mobile advertisement). This system, however, is also well adapted for further filtering purposes such as filtering content associated with malware that is not advertisement related, for example malware that is infiltrated as content requested by a browser or other application.

A malware can breach a mobile advertisement infrastructure, inject an active content in the guise of a mobile advertisement at a mobile advertisement source, propagate the active content up to a mobile advertisement gateway, be delivered to a mobile communication device by the ad gateway in response to a request for a mobile advertisement from an application executing on the device. When the application executing on the device renders the active content associated with the malware, a window may pop-up on the display of the mobile communication device and refuse to close until the user calls a number and pays a bribe or ransom to have the mobile device released. Other malware having different objectives and actions may likewise infiltrate in this way of spoofing normal mobile advertisements and/or embedded in mobile advertisements.

The present disclosure teaches an application executing at the mobile advertisement gateway that analyzes a signature of each mobile advertisement transiting the ad gateway to a mobile communication device, compares the signature of the mobile advertisement to a set of rules that identify known mobile advertisement signatures, and depending on the further instructions embedded in the one or more rules matched by the signature of the mobile advertisement, may block transmission of the subject mobile advertisement to the mobile communication device. A mobile advertisement signature comprises one or more of a brand identity, a color scheme of the advertisement when rendered, a reference image embedded in or linked to by the mobile advertisement, and a font type. While one use case of the system and methods taught herein is interdicting malware spoofing mobile advertisements, the same system and methods are flexible enough to be employed to interdict mobile advertisements that are deemed inappropriate based on the set of rules.

The set of rules may be referred to as mobile advertisement rules or mobile advertisement blocking rules. For example, if a mobile communication device is associated to a 12 year old child, the rules may cause an advertisement for alcoholic beverages to be interdicted or blocked at the ad gateway and not sent to the child's mobile communication device. Other ad blockage rules can relate to inappropriate sexual content, a mobile advertisement for a business competitor (e.g., an application for retail sales organization X executing on the mobile communication device requests a mobile advertisement to display in a banner ad position on the display and a mobile advertisement for retail sales organization Y, a direct competitor of organization X, is directed to the ad gateway for presentation on the device), and the like.

When mobile advertisements are received at the mobile advertisement gateway that are previously unknown, the unknown mobile advertisement may be sent on to the mobile communication device, notwithstanding the chance that the ad may be malware or inappropriate. For example, the analysis application may keep a list of known mobile advertisements, for example based on an identity embedded in the mobile application. The analysis application may check to see if an ad is known by comparing its identity to the list of known advertisements. If a mobile advertisement is not previously known, the application that is analyzing mobile advertisements may send a copy of the mobile advertisement content to a mobile advertisement analysis server computer to be executed by a rules adaptation application. The rules adaptation application may execute the mobile advertisement in a sandbox execution environment to avoid damage to the server and to avoid propagation of malware. The rules adaptation application determines the mobile advertisement signature of the new mobile advertisement. The rules adaptation application takes note of what actions the rendering of the new mobile advertisement may take, such as taking note of HTTP redirects that are commanded by the ad content, taking note of servers the ad content may reach out to.

In various ways, the rules adaptation application may identify the unknown mobile advertisement to be malware or suspected malware. The rules adaptation application may further associate the new mobile advertisement to a category or class of advertisements, such as adult product advertisement, sexual content advertisement, alcoholic beverage advertisement, etc. In an embodiment, the rules adaptation application can automatically build new mobile advertisement rules for use by the mobile advertisement gateway. Alternatively, in an embodiment, the rules adaptation application may notify an administrator or technician to perform further analysis of the unknown advertisement and make a human judgment whether the unknown advertisement is malware or may be associated with a category or class of advertisements (e.g., alcohol, sexual content, corporately sponsored ad, etc.) that may desirably be blocked under some user presentation contexts (e.g., juvenile user, corporate affiliated mobile application execution, etc.). Presentation contexts may further include other aspects pertinent to blocking, such as specifics of the mobile communication device hardware version or model, software version, firmware version, and/or operating system.

In an embodiment, the system further comprises a mobile advertisement analysis client that executes on some of the mobile communication devices. The ad analysis client can identify offensive mobile advertisements or malware that have infiltrated a mobile communication device under the guise of being a mobile advertisement and report these offensive mobile advertisements back to the mobile advertisement rules adaptation application for generating new mobile advertisement blocking rules. In an embodiment, the client may provide a user interface for creating a report of undesired advertising content that automatically captures the signature of the undesired mobile advertisement.

Each of the mobile advertisement rules may comprise a signature and a blocked mobile presentation context. The blocked mobile presentation context may define one or more mobile communication device contexts in which presentation of a mobile advertisement conforming to the subject ad signature is to be blocked. For example, a blocked presentation context may be user age less than 16 years old. A blocked presentation context may be a mobile application associated with a specific corporation or enterprise (e.g., mandating blocking presentation of a mobile advertisement having a brand identity of business Y in a context of execution of the mobile application associated with business X). A blocked mobile presentation context may define one or more subscriber profile attributes. When evaluating a candidate mobile advertisement, the ad gateway filtering application finds one or more rules having a signature that is at least partially matched by the signature of the candidate mobile advertisement. Then the blocked presentation context defined in the one or more rules is compared with a context that applies to the subject mobile communication device. If none of the contexts match the context applied to the device, the mobile advertisement may be sent on to the mobile communication device. If one or more of the contexts match the context applied to the device, the mobile advertisement may be blocked and not transmitted to the mobile communication device. In an embodiment, the ad gateway may send an alternative mobile advertisement to the mobile communication device in lieu of the blocked mobile advertisement.

In an embodiment, some rules may have a presentation context that fits all mobile devices or that is a universal context. This would correspond to the scenario where no mobile advertisement having the signature in the rule would ever be sent to any mobile communication device, for example when the signature corresponds to a malware spoofing a mobile advertisement. The rules may comprise an indication of how many signature components or what mix of signature components is deemed sufficient to invoke application of the rule. For example, some rules may indicate that an ad is blocked only when its signature matches each of the four signature components in the rule. Another rule may indicate that an ad that matched any three of the four signature components in the rule should be blocked. Another rule may indicate that an ad that matched signature component number 2 and any other signature component should be blocked.

While the discussion above has focused on analyzing mobile advertising content and optionally blocking that content if indicated by rules, it is understood that the teachings of the present disclosure are more generally applicable to analyzing and treating other content. For example, non-advertising content of various kinds may be transmitted to the mobile communication device via content gateways, policy gateways, or other servers or nodes in the content delivery channel and that exercise similar content analysis and apply rules to block or transmit content.

The system and method for interdicting infiltration of malware onto mobile communication devices (and interdicting transmitting inappropriate and/or undesired mobile advertisements to devices) can advantageously reduce the susceptibility of mobile communication devices to vicious attacks from malware that attempt to spoof advertisements (or, said in another way, attempt to exploit the mobile advertisement infrastructure), without resorting to completely shutting down a significant source of revenue to mobile communication service providers. When a new attack does propagate out to a device, the system, via the mobile advertisement analysis client executing on mobile devices, can rapidly identify the risk and harden itself to block this threat, by dynamically adapting the mobile advertisement blocking rules. The system and methods comprise an improved distributed computing system.

The system and method for interdicting infiltration of malware can provide a more finely adaptable—a finer granularity solution—response to intrusions of malware or undesirable advertisements. Rather than totally shutting off a source of advertisements or other content, the system described herein can continue to receive content, blocking selectively the offensive malware and/or advertisements.

Figure 1:
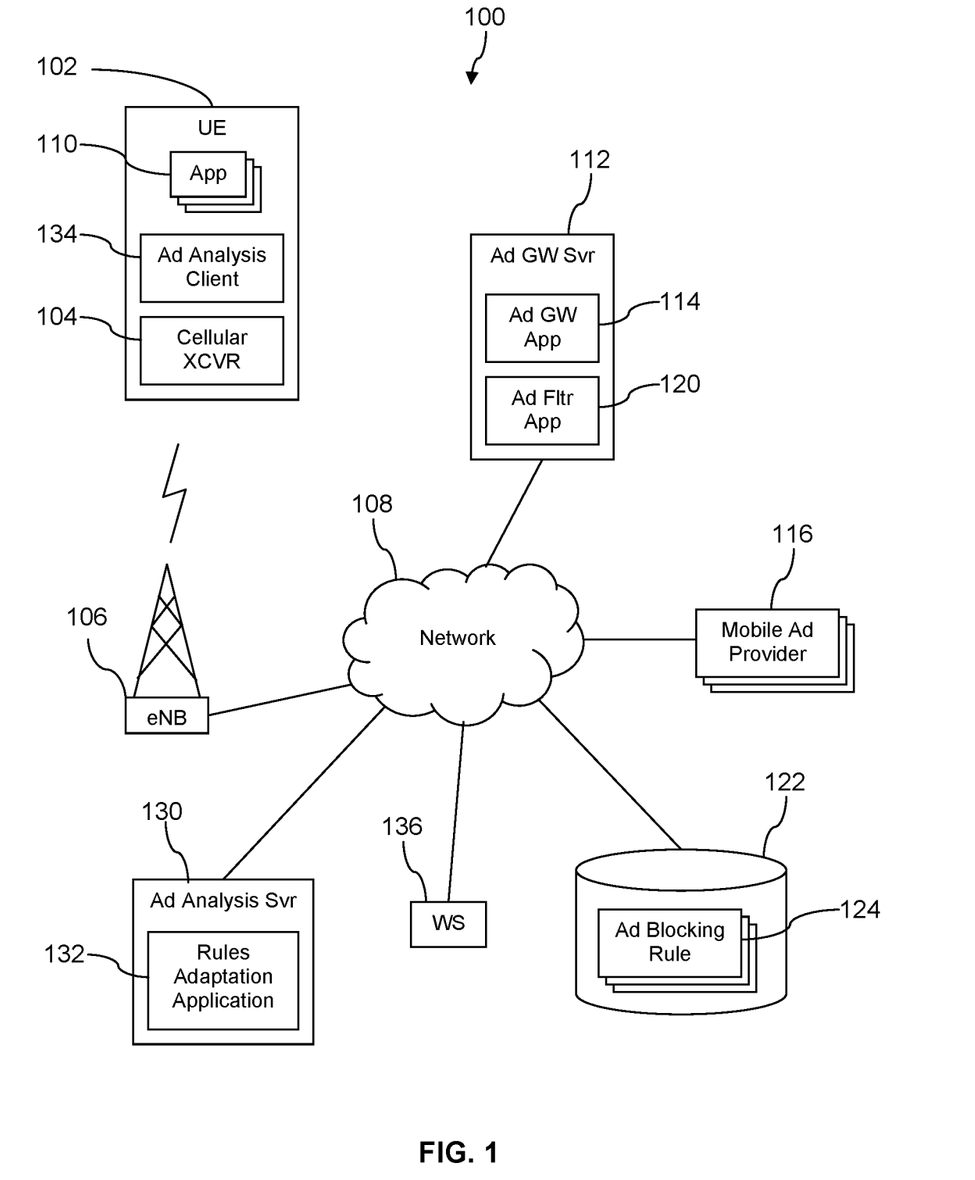
FIG. 1 is a block diagram of a communication system according to an embodiment of the disclosure.

Turning now to FIG. 1, a communication system 100 is described. In an embodiment, the system 100 comprises a user equipment (UE) 102 that communicates wirelessly via cell site 106 to a network 108. For example, a cellular radio transceiver 104 may establish a wireless communication link with the cell site 106. In an embodiment, the cellular radio transceiver 104 communicates with the cell site 106 according to at least one of a long term evolution (LTE), a code division multiple access (CDMA), a global system for mobile communications (GSM), or a worldwide interoperability for microwave access (WiMAX) telecommunications protocol.

In an embodiment a short range radio transceiver (not shown) in the UE 102, such as a WiFi radio transceiver, may establish a wireless link with a short range wireless access point (AP) that provides communication connectivity to the network 108 for UE 102. The UE 102 may be a mobile communication device, a mobile phone, a smart phone, a wearable computer, a headset computer, laptop computer, a tablet computer, a notebook computer, or some other wireless communication enabled mobile device usable by a human being. The cell site 106 may be an enhanced node B (eNB), a base transceiver station (BTS), a picocell device, a WiFi access point, or some other wireless communication portal to the network 108. The network 108 may be one or more private networks, one or more public networks, or a combination thereof.

The UE 102 may comprise a plurality of mobile applications 110 such as a web browser, a voicemail application, a social networking application, a gaming application, a streaming content (i.e., audio or video) application, and/or other applications. Some of the applications 110 may be installed by an original equipment manufacturer (OEM) of the UE 102. Some of the applications 110 may be installed by a user of the UE 102 by downloading one or more mobile applications 110 from a wireless service provider application store or application repository. Some of the applications 110 may be installed by the user of the UE 102 by downloading one or more mobile applications 110 from another source, for example a source uncontrolled and unsecured by either the OEM or the wireless service provider. The mobile applications 110 that are sourced from the OEM and/or via the wireless service provider application repository may, in some cases, be more secure and hardened against computer viruses and/or malware intrusions than are mobile applications 110 that are sourced from other sources, such as a shareware site on the Internet.

When a mobile application 110 executes on the UE 102, mobile advertisements may be requested for presentation in a frame proximate to the application display or within the application display frame, for example in a banner position above a gaming display. The mobile application 110 may be a web browser or it may be another application such as a streaming music application, a navigation application, a gaming application, or other application. For example, the UE 102 may request content. A server may return the content which comprises a slot for a mobile advertisement. The UE 102 may then request a mobile advertisement from a mobile advertisement gateway server 112 to fill the ad slot associated with the content. In an embodiment, an operating system application or a native application installed in a system partition of the UE 102 may request a mobile advertisement to present on the UE 102, for example during a transient display on the UE 102 such as on a swipe screen, on a power-on screen, when transitioning to a different screen, or the like. The mobile advertisement request may propagate via the cell site 106 and the network 108 to the mobile advertisement gateway server 112 that comprises a mobile advertisement gateway application 114. The ad gateway application 114 may receive one or more requests from mobile advertisement providers 116 to supply an ad to fulfill the mobile advertisement request. In some contexts, the mobile advertisement providers 116 may be referred to as mobile advertisement platforms. The ad gateway application 114 may choose one of the mobile advertisements and send associated mobile ad content, for example an HTML document, to the UE 102 for rendering in the banner position on the display. Mobile advertisements may provide a source of revenue to the wireless service provider, to the mobile application provider, and/or to an Internet content provider, who may provide service to an end user of the UE 102 at a reduced cost or in many instances free of cost based on funding their services through the ad revenue.

Unfortunately, cybercriminals have begun to exploit the mobile advertisement infrastructure to infiltrate malware onto the UE 102. As one example, a malware can install itself on the UE 102 via a compromised mobile advertisement or a spoofed mobile advertisement and then present a window on the UE 102 that will not release the display. If the user wants to again enjoy the use of the UE 102, they are instructed to call a number to pay a kind of ransom or bribe to have the display expropriation released. Other malware may be viruses that maliciously degrade the functionality of the UE 102. Other malware may be worms that play a role in distributed denial of service (DDoS) attacks on an Internet web site. Other malware may surreptitiously collect private behavioral information over time from the UE 102 and send that private information back to another site, invading the privacy of the user of the UE 102. Other malware may access confidential information on the UE 102, for example contact information, email records, and/or photos, and export this private information to another site. It is understood that this short list of examples of malware is not comprehensive or exhaustive. Malware attacks such as this can cost wireless service providers a lot of money if they have to pay the ransoms demanded by some malware. The attacks can cause wireless service providers and others to suffer financial losses associated with users not doing things that otherwise they would do, such as purchasing mobile applications, such as visiting on-line retail web sites. And clearly such attacks represent a very serious threat to user's privacy rights.

In an embodiment, the system 100 comprises a mobile advertisement filtering application 120 that executes on the mobile advertisement gateway server 112. The mobile ad filtering application 120 analyzes mobile advertisements as they transit the mobile advertisement gateway server 112 and may block propagation of some of the mobile advertisements to the UE 102 based on mobile advertisement blocking rules 124 stored in a mobile advertisement blocking rules data store 122. The filtering application 120 parses the mobile advertisement content to determine a signature of the mobile ad. In an embodiment, the signature may comprise one or more of a brand identity, a color scheme, a reference image, and a font type. A brand identity may be the name of a retail store brand, the name of a sports apparel brand, the name of a car maker, a beer brand, or another brand name. A color scheme may be one or more colors that are commonly associated with a specific advertisement and/or a specific advertiser. A reference image may be an identifier of a digital image, a numerical hash or other digital digest determined over the digital content of the reference image, a name of a digital image, or other. A font type may be a name of a font type.

It is observed that in an embodiment, the signature does not comprise a self-reported identity or a self-reported advertisement category provided by the creator of the mobile advertisement. Such self-reported identities or categories are highly subject to falsification by spoofing malware and may therefore be of only dubious value for blocking malware mobile advertisements. In an embodiment, the signature may comprise an advertisement identify and/or advertisement category that is determined and assigned by the mobile advertisement filtering application 120, for example based on analysis of the mobile advertisement content.

In some circumstances, the filtering application 120 may not be able to determine all four components of an advertisement signature. It may only be able to identity three of four components or only two of four components or only one component. The mobile advertisement filtering application 120 may then use the advertisement signature to access one or more mobile advertisement blocking rules 124 from the data store 122. The mobile advertisement filtering application 120 may access all mobile ad blocking rules 124 that are consistent with the components of advertisement signature of a mobile advertisement being analyzed. In some cases, the mobile ad blocking rules 124 may each define a sufficient matching criteria for applying that rule to block presentation of the mobile advertisement by the UE 102.

Figure 2:
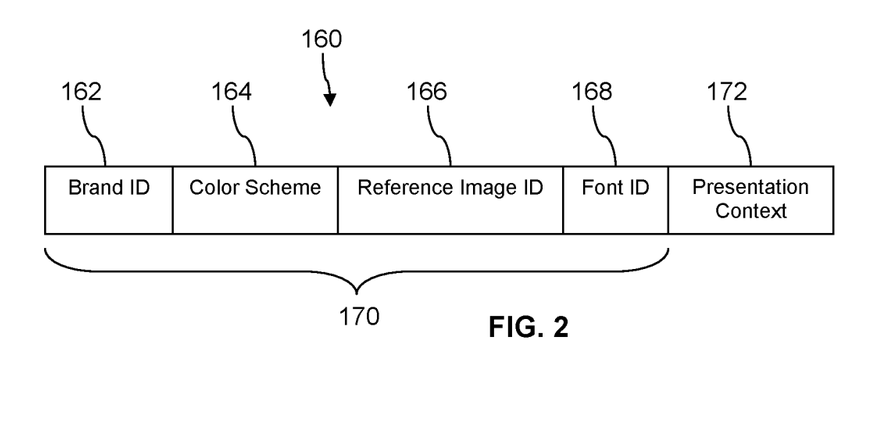
FIG. 2 is an illustration of a mobile advertisement blocking rule according to an embodiment of the disclosure.

Turning now to FIG. 2, a mobile advertisement blocking rule 160 is described. The advertisement blocking rule 160 may be one of the mobile advertisement blocking rules 124 stored in the data store 122. In an embodiment, the mobile advertisement blocking rule 160 comprises a signature 170 and a presentation context 172. The signature 170 comprises one or more of a brand identity 162, a color scheme 164, a reference image identity 166, and a font identity 168. It is understood that in some embodiments the signature 170 may comprise additional components or fields. The signature 170 may serve in part as an identity of a mobile advertisement. The signature 170 may not uniquely identify a mobile advertisement. For example, it may be that two different mobile advertisements may conform to the same signature 170, particularly if fewer than all four of the signature components are parsed from a mobile advertisement by the mobile advertisement filtering application 120. The presentation context 172 may identify a context of operating the UE 102 for which a mobile advertisement conforming to the signature 170 ought to be blocked and prevented from propagating out to the UE 102. For example, the presentation context may be juvenile user, minor user, no sexual content, a mobile application identity, and others. The presentation context 172 may in some cases indicate "all" or be empty. This would have the effect of making the ad blocking rule 160 applicable (e.g., to cause the mobile advertisement filtering application 120 to block) to any mobile advertisement that matched the signature 170 or a portion of the signature. Presentation contexts may further include other aspects pertinent to blocking, such as specifics of the hardware version or model, software version, firmware version, and/or operating system of the UE 102.

With reference now to both FIG. 1 and FIG. 2, a mobile advertisement may be sent from a mobile advertisement provider 116 to the mobile advertisement ad gateway server 112 that has a signature 170, as determined by the mobile advertisement filtering application 120, which maps to a first mobile advertisement blocking rule 124, 160. The mobile advertisement filtering application 120 finds that the presentation context 172 of the associated first mobile advertisement blocking rule 124, 160 is empty or has an "all" value. This value in the presentation context 172 means that the associated mobile advertisement should be blocked and prevented from being sent to the UE 102 for all contexts. This may be the case if the mobile advertisement signature 170 is associated with malware. For example, if the subject mobile advertisement is suspected of being malware, it is undesirable for such a malware to be sent to a UE 102 operated by a juvenile, a UE 102 operated by an adult, or to any mobile application 110 whatsoever. Consequently, in this example, the subject mobile advertisement would not be sent on to the UE 102.

In an embodiment, the UE 102 may retrieve a different mobile advertisement for substitution. For example, the UE 102 may simply select a different request from the mobile advertisement providers 116 and perform the same parsing and analysis on the offered mobile advertisement as described above. Alternatively, in an embodiment, the mobile advertisement gateway server 112 and/or mobile advertisement gateway application 114 may maintain a cache of trusted and/or previously screened mobile advertisements and select one of these trusted mobile advertisements to send to the UE 102 for presentation. Using such a cache of trusted mobile advertisements may promote the mobile advertisement gateway server 112 responding timely to requests for mobile advertisements from the applications 110.

In an embodiment, the mobile advertisement filtering application 120 can likewise block or filter mobile advertisements that are not suspected of being malware but are deemed undesirable to present on the UE 102 for another reason. For example, a mobile advertisement for an alcoholic beverage may be undesirable to display on the UE 102 of a juvenile user or a minor user. For example, a mobile advertisement for a competing retail hardware store may be undesirable to display proximate to the mobile application 110 of a different retail hardware store. The determination to block a mobile advertisement based on display context can be made by the mobile advertisement filtering application 120 based on the presentation context 172 of the mobile advertisement blocking rule 124. In an embodiment, the same advertisement signature 170 may be present in a plurality of mobile advertisement blocking rules 124, 160 in the data store 122, each having a different value of presentation context 172.

Alternatively, in an embodiment, the presentation context 172 may comprise a list of all presentation context values to which a common signature 170 is associated. For example, a first rum maker may request creation of a mobile application blocking rule 124, 160 that blocks presentation of a second rum maker in a presentation context of a mobile application 110 providing recipes for rum-based drinks and rum-based cakes distributed by the first rum maker. The rule 124, 160 may then have a brand identity 162 that identifies second rum maker and a presentation context 172 that identifies the first rum maker's mobile application 110 and also identifies juvenile user. Thus, if a mobile advertisement from the second rum maker is offered for presentation in either (A) the recipe application distributed by the first rum maker or (B) any display on a UE 102 belonging to a juvenile, the ad would be blocked by the mobile advertisement filtering application 120.

When multiple different presentation context values are present, the advertisement blocking rule 124, 160 may contain multiple different matching criteria, one criterion per context. For example, when two contexts are identified within the presentation context 172, the matching criterion of the first context may require a match on the brand identity 162 value defined by the rule and a match to any one of the remaining three components of the signature 170; while the matching criterion of the second context may require a match on the color scheme 164 and the reference image identity 166 components of the signature 170.

When a new, previously unknown mobile advertisement is received by the mobile advertisement gateway server 112 and analyzed by the mobile advertisement filtering application 120, though previously unknown, the signature of the new mobile advertisement may still have a signature that matches, at least partially, a mobile advertisement blocking rule 124, 160 and hence be blocked by the mobile advertisement filtering application 120, provided the presentation context 172 of the rule fits the subject UE 102. Thus, the filtering of mobile advertisements as taught herein is not dependent on previous knowledge of the mobile advertisements. Further, the mobile advertisement filtering application 120 does not depend on self-categorization of mobile advertisements. Such self-categorization may be optional and may in fact be false, as for instance in the case of malware.

In an embodiment, the UE 102 further comprises a mobile advertisement analysis client application 134. The mobile advertisement analysis client application 134 may identify undesirable mobile advertisements that are passed on by the mobile advertisement filtering application 120 and the mobile advertisement gateway application 114 to the UE 102 and report these mobile advertisements back to a rules adaptation application 132 executing on a mobile advertisement analysis server 130. The mobile advertisement analysis client 134 may identify an undesirable mobile advertisement when a screen of the UE 102 is locked or monopolized by an advertisement. The mobile advertisement analysis client application 134 may perform analysis on the subject mobile advertisement, parse a signature of the offensive mobile advertisement, and send this signature back to the rules adaptation application 132.

In an embodiment, the mobile advertisement analysis client application 134 may provide other mobile advertisement services on the UE 102. For example, the mobile advertisement analysis client application 134 may interwork with applications 110 to request mobile advertisements from the mobile advertisement gateway server 112 when an opportunity occurs to present an advertisement. The mobile advertisement analysis client application 134 may communicate with a software development kit (SDK) application programming interface (API) that is used to build some of the mobile applications 110. Thus, the mobile application 110 that is built with the subject SDK may be aware of events within the application that are suitable for requesting and presenting mobile advertisements, for example initiation of a gaming application, a pause in game play, advancement to a new game level, or other event. If the mobile application 110 is a browser, events may include browsing to a new web page or passage of a predefined period of time. A mobile application 110 built with the SDK may call an API method of the mobile advertisement analysis client application 134 to request and receive a mobile advertisement.

The rules adaptation application 132 may generate a new mobile advertisement blocking rule 124, 160 based on the information sent by the client 134. In this way, offensive mobile applications may be quickly identified and defended against. The mobile advertisement analysis client application 134 may provide a user interface or control to users of the UE 102 for indicating that a mobile advertisement that has been presented on the UE 102 is undesired. For example, a distinctively shaped icon may appear adjacent to an application window that the user may select. When selected, a dialog box may be presented that prompts the user to indicate what about the mobile ad is undesirable or offensive. The dialog box may allow the user to enter a short textual description of why the mobile advertisement was unwelcome. Alternatively, the user may only be able to click a button which initiates capturing a signature of a displayed mobile advertisement and sending a message with the signature, with the identity of the UE 102, with a reference to the source of the mobile advertisement, and with the information that the mobile advertisement was unwelcome on this particular UE 102. Subsequently, a technician or IT administrator may analyze the report and signature and optionally create an associated new mobile advertisement blocking rule 124.

In an embodiment, a technician or IT administrator may use a work station 136 to create new mobile advertisement blocking rules 124, 160. When a mobile advertisement is received by the mobile advertisement filtering application 120 that is previously unknown, the subject mobile application may be sent on to the UE 102 and also sent to the mobile advertisement rules adaptation application 132. The rules adaptation application 132 may execute and/or render the subject mobile advertisement in a sandbox or other secure execution environment and analyze the behavior of the mobile advertisement.

The sandbox may provide a simulated mobile phone execution environment, for example a virtual mobile operating system, where the mobile advertisement under observation will execute in the context or environment of the virtual mobile operating system. The rules adaptation application 132 may create a new mobile advertisement blocking rule 124, 160 based on a signature of the subject mobile advertisement if the rendering and/or execution of the ad in the sandbox is anomalous, for example if the mobile advertisement attempts to invoke operating system commands that are unusual for a mobile advertisement or attempts to communicate back to the Internet in an unusual or suspicious manner.

In an embodiment, a technician or IT administrator may initiate rendering and/or execution of the mobile advertisement in the sandbox and observe its behavior. The technician or IT administrator may categorize or classify the general type of mobile advertisement. The technician or IT administrator may create a new mobile advertisement blocking rule 124, 160 that corresponds to or defines a signature 170 that matches to a corresponding signature of the mobile advertisement. This rule creation may be based at least in part on the categorization or classification of the mobile advertisement. For example, if the categorization of a mobile advertisement is retail alcoholic beverage, this may be used to decide to include juvenile in a presentation category for which the ad would be blocked.

Figure 3:
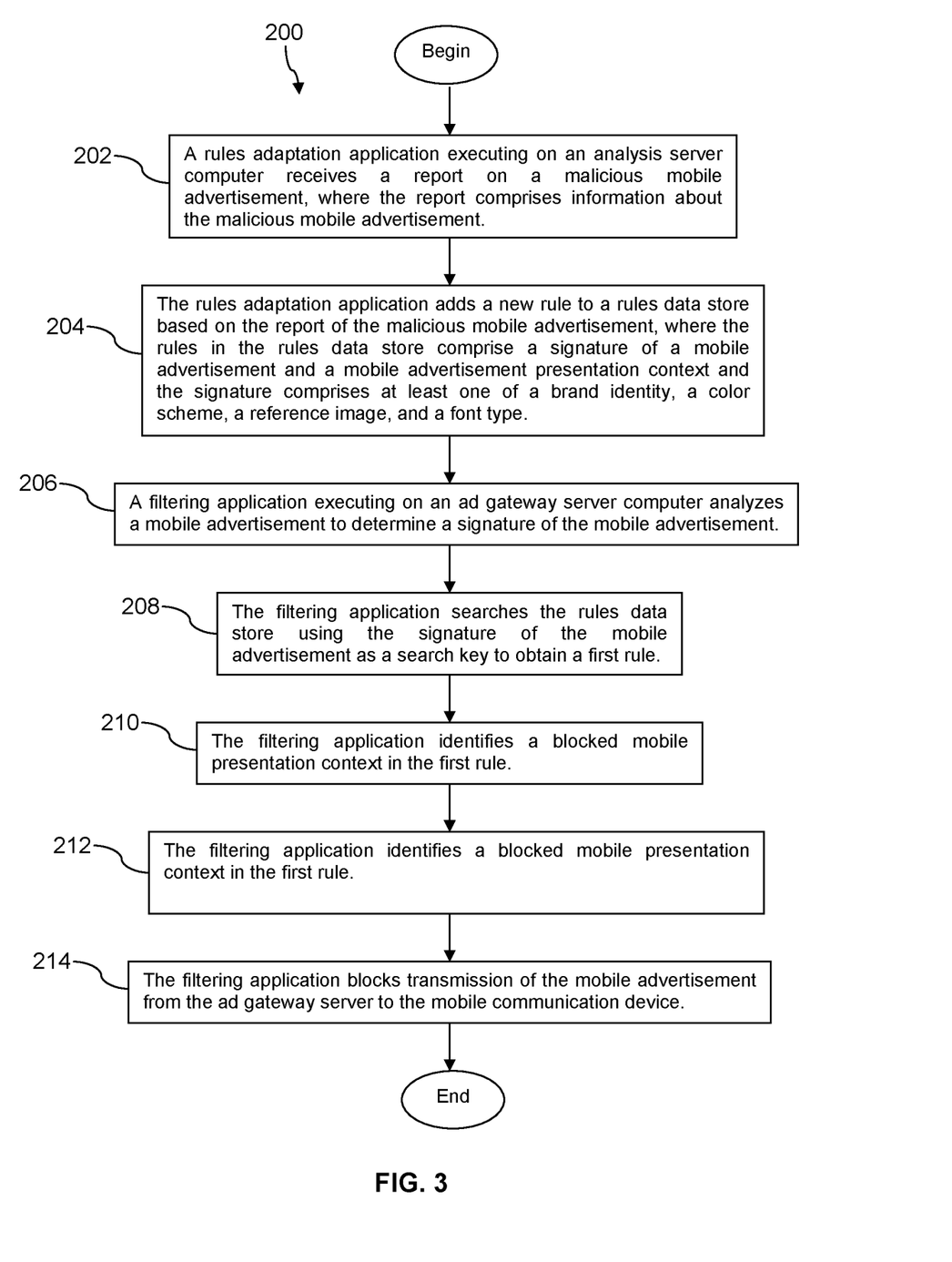
FIG. 3 is a flow chart of a method according to an embodiment of the disclosure.

Turning now to FIG. 3, a method 200 is described. At block 202, a rules adaptation application executing on an analysis server computer receives a report on a malicious mobile advertisement, where the report comprises information about the malicious mobile advertisement. At block 204, the rules adaptation application adds a new rule to a rules data store based on the report of the malicious mobile advertisement, where the rules in the rules data store comprise a signature of a mobile advertisement and a mobile advertisement presentation context and the signature comprises at least one of a brand identity, a color scheme, a reference image, and a font type.

At block 206, a filtering application executing on an ad gateway server computer analyzes a mobile advertisement to determine a signature of the mobile advertisement. At block 208, the filtering application searches the rules data store using the signature of the mobile advertisement as a search key to obtain a first rule.

At block 210, the filtering application identifies a blocked mobile presentation context in the first rule. At block 212, the filtering application identifies a blocked mobile presentation context in the first rule. At block 214, the filtering application blocks transmission of the mobile advertisement from the ad gateway server to the mobile communication device.

Figure 4:
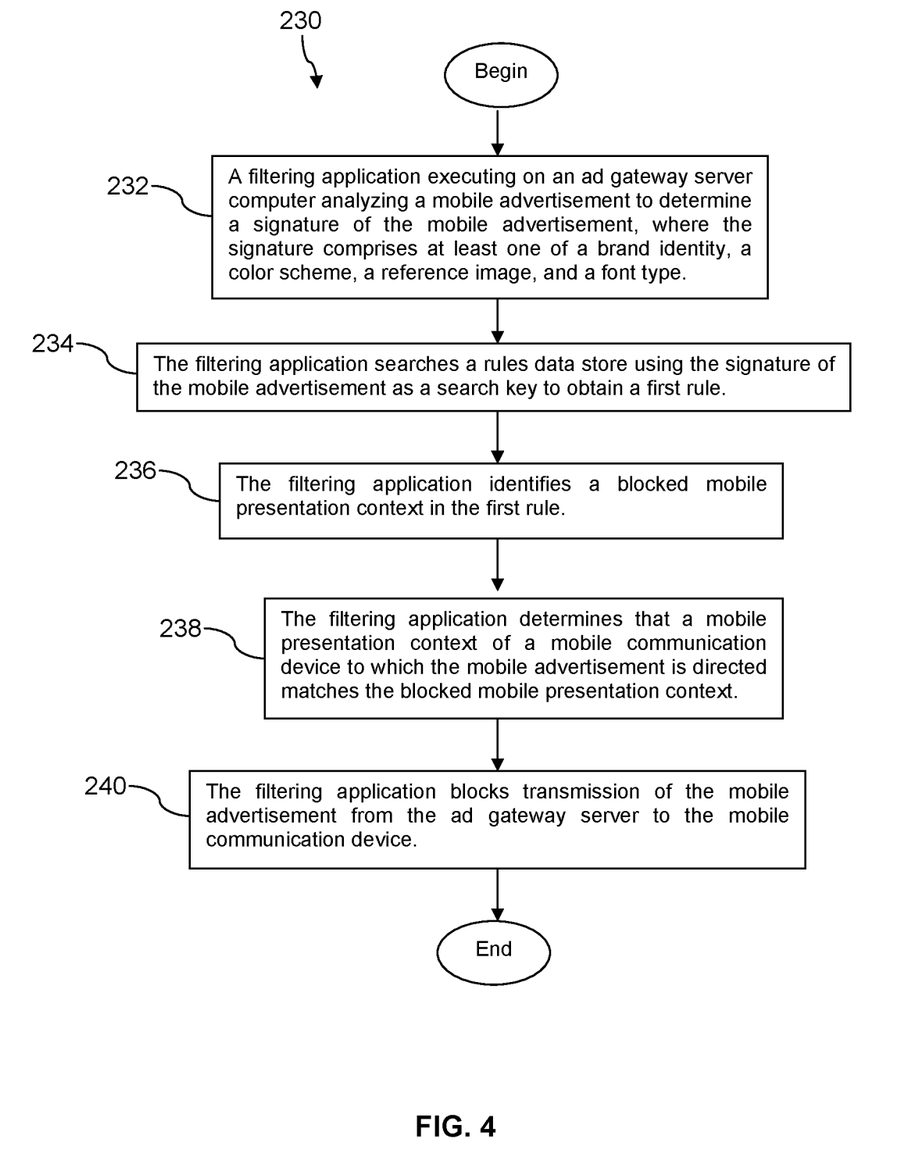
FIG. 4 is a flow chart of another method according to an embodiment of the disclosure.

Turning now to FIG. 4, a method 230 is described. At block 232, a filtering application executing on an ad gateway server computer analyzing a mobile advertisement to determine a signature of the mobile advertisement, where the signature comprises at least one of a brand identity, a color scheme, a reference image, and a font type. At block 234, the filtering application searches a rules data store using the signature of the mobile advertisement as a search key to obtain a first rule. In some cases the filtering application may block transmission of the mobile advertisement from the ad gateway to the mobile communication device based on the match of the first rule to the signature of the mobile advertisement directly, without further consideration of a mobile presentation context of the UE 102. This may be the case, for example, if the mobile advertisement is known malware. Said in another way, the rule associated with the signature of known malware may not specify a mobile presentation context or may be specify all or universal mobile presentation context (the rule applies to all mobile devices, all presentation contexts).

At block 236, the filtering application identifies a blocked mobile presentation context in the first rule. At block 238, the filtering application determines that a mobile presentation context of a mobile communication device to which the mobile advertisement is directed matches the blocked mobile presentation context. At block 240, the filtering application blocks transmission of the mobile advertisement from the ad gateway server to the mobile communication device.

Figure 5:
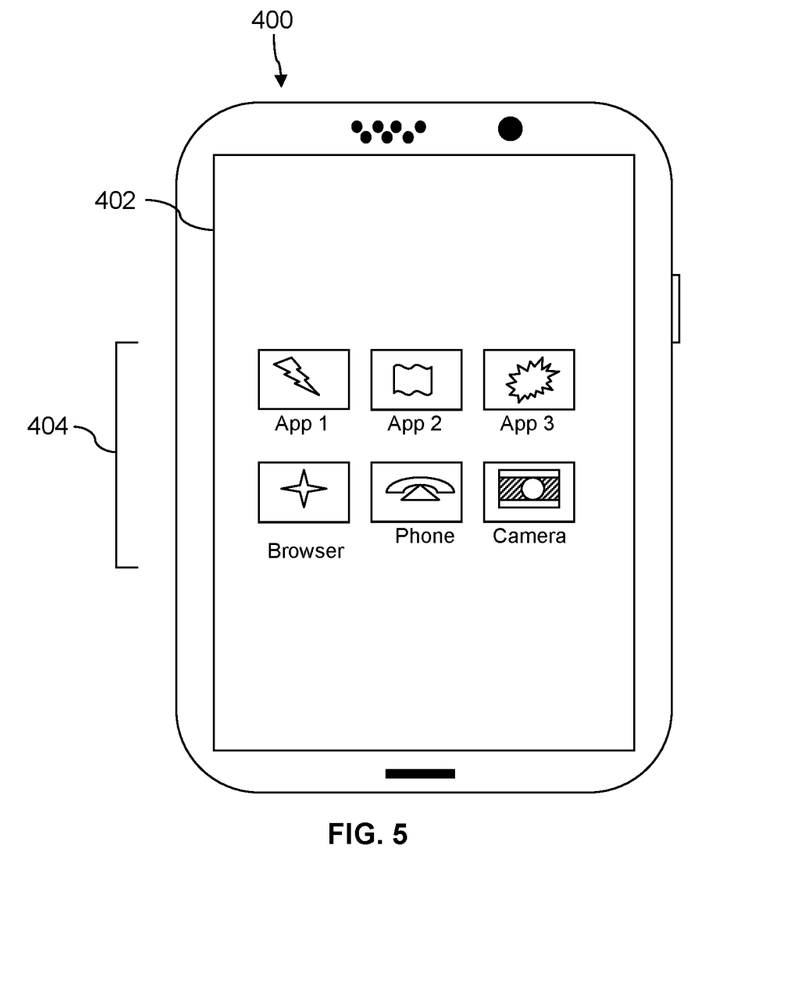
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
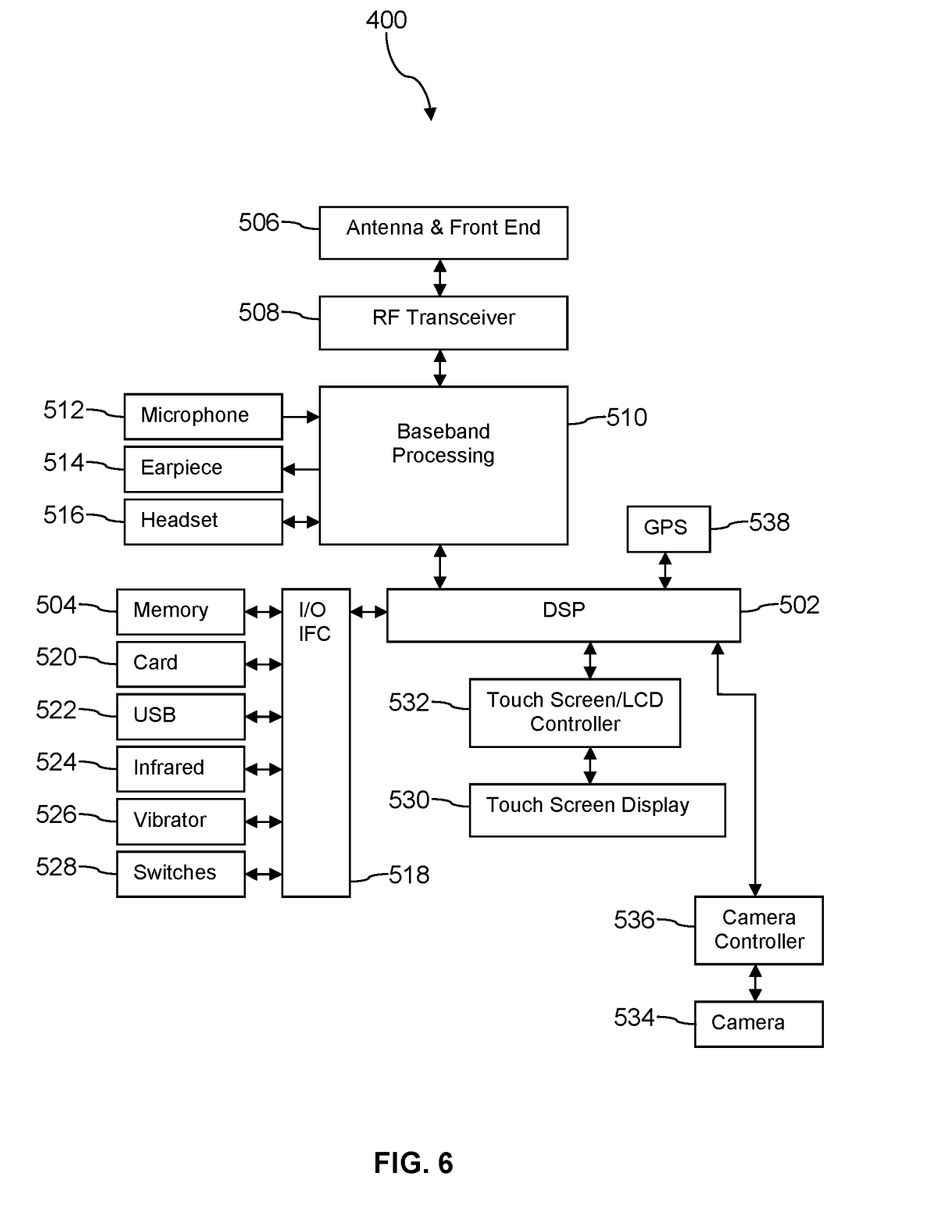
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
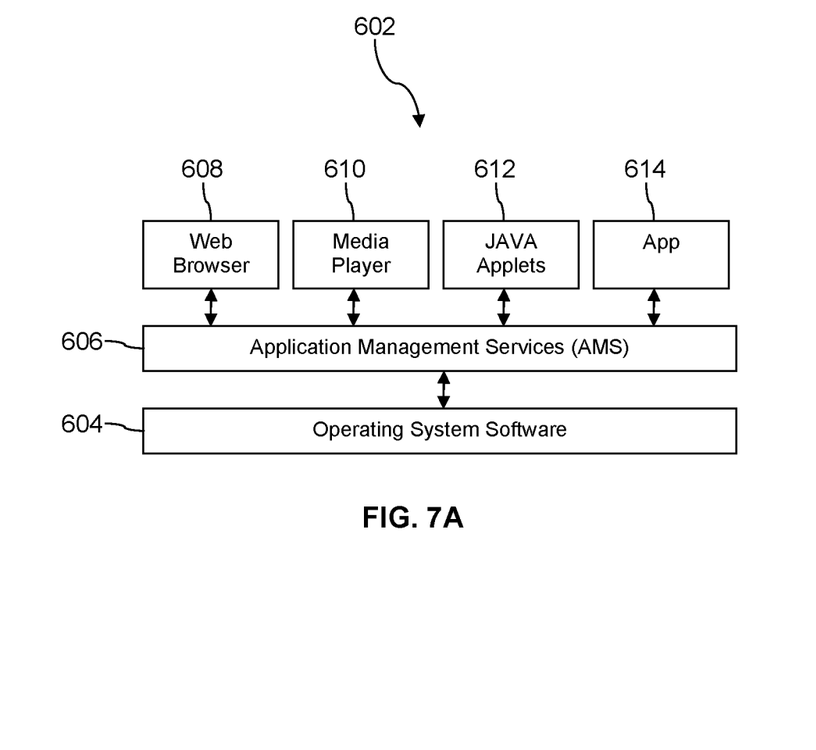
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

The third party application 614 may be dynamically downloaded and installed during a first time that the mobile communication device 400 enters the retail store 104 (e.g., any of a plurality of retails stores associated with a particular enterprise) and may be activated on subsequent entries into the retail store 104. Alternatively, the third party application 614 may be installed in another way (e.g., the user elects to install the application 614, for example to obtain coupons or other desirable features provided via the application 614).

Figure 7B:
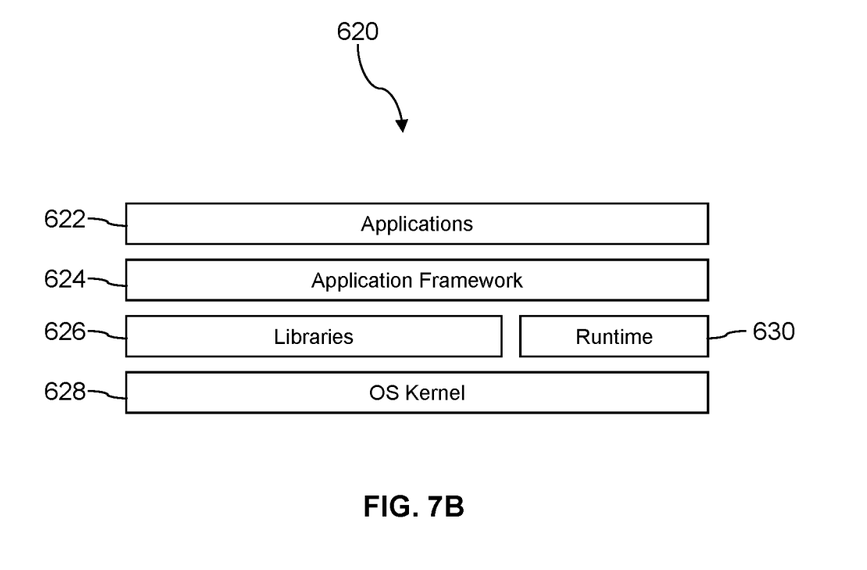
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
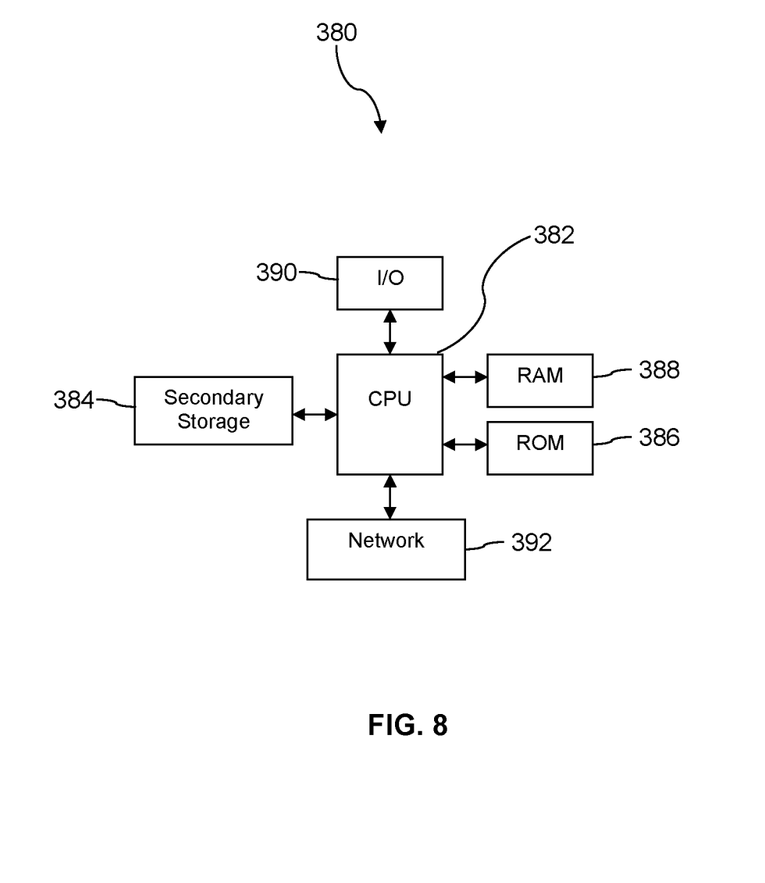
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of thwarting infiltration of malware onto a mobile communication device, comprising:
    receiving a report on a malicious mobile advertisement by a rules adaptation application executing on an analysis server computer, where the report comprises information about the malicious mobile advertisement;
    adding a new rule to a non-transitory rules data store by the rules adaptation application based on the report of the malicious mobile advertisement, where the rules in the non-transitory rules data store comprise a signature of a mobile advertisement and a mobile advertisement presentation context and the signature comprises at least one of a brand identity, a color scheme, a reference image, and a font type;

analyzing a mobile advertisement by a filtering application executing on an ad gateway server computer to determine the signature of the mobile advertisement;

searching the non-transitory rules data store by the filtering application using the signature of the mobile advertisement as a search key to obtain a first rule;

identifying a first mobile advertisement presentation context in the first rule by the filtering application;

determining that a mobile presentation context of a mobile communication device to which the mobile advertisement is directed by the filtering application matches the first mobile presentation context of the first rule; and blocking by the filtering application transmission of the mobile advertisement from the ad gateway server to the mobile communication device.

2. The method of claim 1, wherein the new rule comprises an empty mobile advertisement presentation context, indicating that all mobile advertisements having a signature matching the signature defined in the new rule are to be blocked by the filtering application notwithstanding the presentation context of a second mobile communication device that requested the mobile advertisement.

3. The method of claim 2, further comprising: analyzing a second mobile advertisement by the filtering application to determine a second signature of the second mobile advertisement; searching the non-transitory rules data store by the filtering application using the second signature as a search key to obtain the new rule; identifying the empty mobile advertisement presentation context in the new rule by the filtering application; and blocking by the filtering application transmission of the mobile advertisement from the ad gateway server to the second mobile communication device, skipping the step of determining a mobile presentation context of the second mobile communication device in view of the empty mobile advertisement presentation context in the new rule.

4. The method of claim 3, further comprising:
selecting a trusted mobile advertisement from a cache of trusted mobile advertisements maintained by the ad gateway computer; and
transmitting the selected trusted mobile advertisement to the second mobile communication device.

5. The method of claim 1, wherein at least some of the rules in the non-transitory rules data store comprise a mobile advertisement presentation context that identify a plurality of different presentation contexts.

6. The method of claim 5, wherein a first mobile advertisement presentation context value is juvenile user.

7. The method of claim 5, wherein a second mobile advertisement presentation context value is an identity of a mobile application.

8. The method of claim 5, wherein a third mobile advertisement presentation context value is no sexual content.

* * * * *